(12) United States Patent
Lampert et al.

(10) Patent No.: US 10,685,518 B2
(45) Date of Patent: *Jun. 16, 2020

(54) SMART HOME DELIVERY AND SERVICES

(71) Applicant: TRANSFORM SR BRANDS LLC, Hoffman Estates, IL (US)

(72) Inventors: Edward S. Lampert, Bay Harbor, FL (US); Leena Munjal, Algonquin, IL (US); Varun Agasti, Algonquin, IL (US); Robert Baker, Hoffman Estates, IL (US); Scott H. Multer, Chicago, IL (US); Smita Katakwar, Westborough, MA (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/285,879

(22) Filed: Feb. 26, 2019

(65) Prior Publication Data

US 2019/0266825 A1 Aug. 29, 2019

Related U.S. Application Data

(63) Continuation of application No. 15/293,273, filed on Oct. 13, 2016, now Pat. No. 10,217,306.

(60) Provisional application No. 62/240,872, filed on Oct. 13, 2015.

(51) Int. Cl.
| | | |
|---|---|---|
| *G08B 13/196* | (2006.01) | |
| *H04N 7/18* | (2006.01) | |
| *G07C 9/00* | (2020.01) | |
| *G07C 9/38* | (2020.01) | |

(52) U.S. Cl.
CPC ..... *G07C 9/00571* (2013.01); *G07C 9/00896* (2013.01); *G07C 9/38* (2020.01); *H04N 7/186* (2013.01)

(58) Field of Classification Search
None
See application file for complete search history.

(56) References Cited

U.S. PATENT DOCUMENTS

| | | |
|---|---|---|
| 9,728,077 B1 | 8/2017 | Fu |
| 2015/0156031 A1 | 6/2015 | Fadell |
| 2015/0312531 A1 | 10/2015 | Samad |

*Primary Examiner* — Dave Czekaj
*Assistant Examiner* — Samuel D Fereja
(74) *Attorney, Agent, or Firm* — McAndrews, Held & Malloy, Ltd.

(57) ABSTRACT

The present application relates to a method and system that enable consumers to have deliveries made and services performed safely and securely when they are not at the location at which the delivery is made or service is performed.

19 Claims, 1 Drawing Sheet

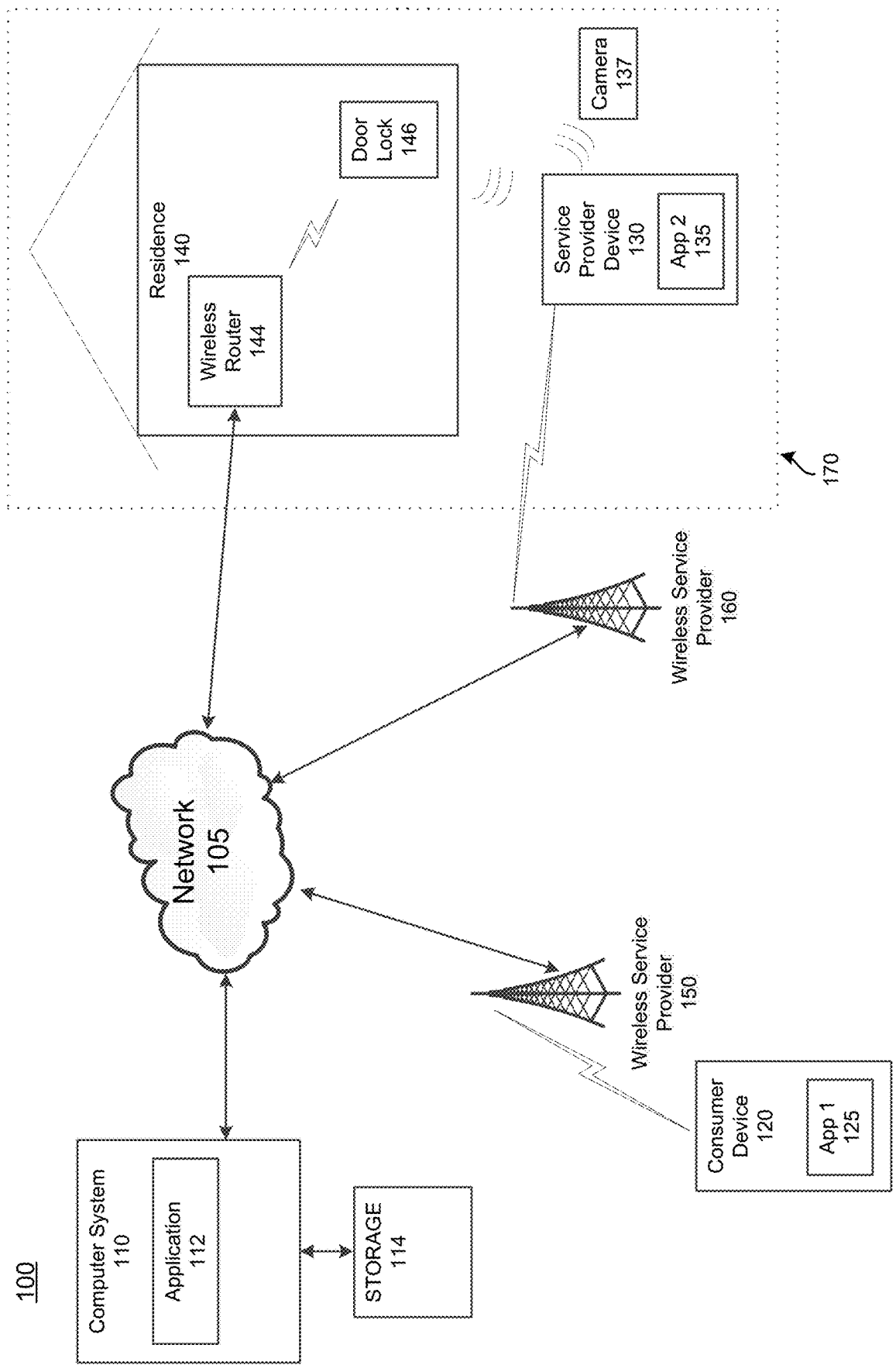

SMART HOME DELIVERY AND SERVICES

CROSS-REFERENCE TO RELATED APPLICATIONS/INCORPORATION BY REFERENCE

The present patent application is a continuation of U.S. patent application Ser. No. 15/293,273, filed on Oct. 13, 2016, now issued U.S. Pat. No. 10,217,306, and makes reference to, claims priority to, and claims benefit from U.S. Provisional Patent Application No. 62/240,872, filed on Oct. 13, 2013, all of which applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

The use of on-line (Internet-based) shopping with home delivery via commercial carriers is rapidly growing. In addition, consumers increasingly find themselves wishing to have service personnel perform repairs or other services in their homes, but find it difficult to schedule the work because the consumer must be at home to admit the worker into their home. Limitations and disadvantages of conventional methods and systems will become apparent to one of skill in the art, through comparison of such approaches with some aspects of the present methods and systems set forth in the remainder of this disclosure with reference to the drawings.

BRIEF DESCRIPTION OF SEVERAL VIEWS OF THE DRAWINGS

FIG. 1 is a block diagram illustrating the elements of an example system, in accordance with various aspects of the present disclosure.

SUMMARY

Various aspects of this disclosure provide a method and system that enable consumers to have deliveries made and services performed safely and securely when they are not at the location at which the delivery is made or service is performed.

DETAILED DESCRIPTION OF VARIOUS ASPECTS OF THE DISCLOSURE

The present application relates to ways of delivering goods and services to consumers. More specifically, the present application relates to a method and system that enable consumers to have deliveries made and services performed safely and securely when the consumer is not at the location at which the delivery is to be made or the service is to be performed.

The following discussion describes a system and method that provides a consumer with the ability to receive a service (e.g., delivery of product(s), installation of new product, repairs of an existing product, or other services, etc.), without having to be at the location at which the service is to be performed (e.g., the residence of the consumer). The approach provides the consumer with the option of allowing a service provider access to their home to permit them to complete the requested services, and to receive real-time updates of the service being performed.

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

The inventive method and system described below provides for the safe and secure unattended delivery of goods and services to a consumer residence.

FIG. 1 is a block diagram illustrating the elements of an example system 100, in accordance with various aspects of the present disclosure. The illustration of FIG. 1 shows a network 105, a computer system 110, a consumer device 120, a service provider device 130, and a residence 140. The network 105 may act to provide communication of information between the various elements of FIG. 1.

The computer system 110 may comprise one or more processors that may be co-located or physically distributed, and may comprise a non-transitory storage medium in which executable instructions are stored, accessed, and executed by the one or more processors. The executable instructions may cause the one or more processors to communicate with the storage 114, and with the various elements of the system 100 of FIG. 1 via the network 105. The computer system 110 comprises one or more software applications 112 including, for example, web server applications for serving web pages to web browsers running on various user devices accessible via the network 105, and may also comprise web services applications and other software applications to provide various services to devices accessible via the network 105 such as, for example, the consumer device 120, the service provider device 130, and various devices located in the consumer home 140. The storage 114, in addition to storing executable instructions for the one or more processors of the computer system 115 may be used to store information for a plurality of consumers such as, for example, the consumer of consumer home 140 and various parameters and details to allow remote access to and/or use of various devices in the consumer home 140, including any devices wirelessly linked to the wireless router 144.

In addition to the functionality described above, the computer system 110 may include functionality for processing in-store and/or on-line (e.g., Internet-based) consumer transactions such as, for example, the purchase, return, and/or exchange or goods and/or services, or be equipped to receive such consumer transaction information from computer systems that process such in-store and/or on-line consumer transactions, such as via consumer access to web pages served by the web server functionality described above.

The consumer device 120 may communicate wirelessly via, for example, the voice and/or data services of a wireless service provider 150, which may provide connectivity to the network 105 to consumer device 120. Wireless service provider 150 may, for example, provide wireless communication services using cellular, Wi-Fi, CDMA, TDMA, GSM, and/or and other suitable wireless interface standard such as those disclosed herein. The consumer device 120 may be, for example, a smart phone, tablet, personal computer or other device suitably equipped for wired and/or wireless communication, and may have stored thereon one or more software applications ("App 1") 125, one of which may provide functionality to permit the consumer user to access web pages from computer system 110, and for the App 1 125 to communicate with a software application 112 that provides functionality to permit the consumer user to remotely granted access to and monitor the actions of service providers at the home 140 of the consumer. The consumer device may be equipped with a global navigation satellite system (GNSS) receiver (e.g., GPS receiver) enabling the consumer device 120 to determine and report its geographic location to the computer system 110.

The service provider device 130 may communicate wirelessly via, for example, the voice and/or data services of a wireless service provider 160, which may or may not be the same wireless service provider as wireless service provider 150, and which may provide connectivity to the network 105 to the service provider device 130. Wireless service provider 160 may, for example, provide wireless communication services using cellular, Wi-Fi, CDMA, TDMA, GSM, and/or any other suitable wireless interface standard such as those disclosed herein. The service provider device 130 may be, for example, a smart phone, tablet, personal computer or other device suitably equipped for wired and/or wireless communication, and may have stored thereon one or more software applications ("App 2") 135, one of which may provide functionality to permit the service provider user to access web pages from computer system 110, and for the App 2 135 to communicate with the software application 112 that provides functionality to permit the consumer (e.g., using App 1 125 of consumer device 120) to remotely grant access to the consumer home 140 to the service provider user of service provider device 130, and to monitor the actions of service providers at the home 140 of the consumer. The service provider device 130 may be equipped to communicate using a low-power or personal area network (PAN) such as, for example, using a Wi-Fi (IEEE 802.11a/b/g/n/ac/af-compatible wireless interface, and/or a short-range wireless communication technology such as, for example, a Bluetooth-compatible wireless interface. Such wireless, or alternately, wired communication capability of the service provider device 130 may be used to connect to a digital still frame or video camera 137, similar to a body camera used by some police departments, that may be controlled and monitored by the App 2 135 running on the service provider device 130 of FIG. 1. Images and video from the camera 137 may be communicated via the software functionality of the App 2 135 in service provider device 130 to the computer system 110 for preservation in storage 114 and/or distribution to the consumer device 120 for display to the consumer. The App 1 125 and App 2 135 may provide text and/or voice communication between the consumer device 120 and the service provider device 135, to permit the consumer and service provider to communicate with one another in accordance with the supervision and/or control of the software application 112 of computer system 110.

The residence 140 may include, for example, a wireless router 144 that communicates via a wired or wireless connection to the network 105, and may include wireless interface functionality compatible with any of a variety of wireless communication standards including, for example, the IEEE 802.11a/b/g/n/ac/af standards, and may also communicate using low-power, short range wireless radio-frequency interfaces such as Bluetooth, ZigBee, LoRan, or other wireless technology. As illustrated in FIG. 1, the consumer home 140 may also include a door lock 146 that is wirelessly linked to the wireless router 144 using any of the radio frequency technologies mentioned above. In addition to being able to communicate with the wireless router 144, the door lock 146 may be suitably equipped to communicate directly with the consumer device 120 and/or the service provider device 130 using, for example, signals compatible with Wi-Fi, Bluetooth, and/or any other suitable wireless interface standard such as those described above.

In addition to the above, the illustration of FIG. 1 shows a virtual boundary 170 that may be, for example, a geographic region surrounding the residence 140 that defines a zone used for acceptance and control of access to the residence 140 by a service provider. The virtual boundary 170 may be enforced using, for example, signals communicated between and/or among the service provider device 130, the wireless router 144, the door lock 146, and/or the camera 137, described above. The enforcement of the virtual boundary 170 may also use GNSS-based geo-location functionality of the service provider device 130, as described below.

In accordance with various aspects of the present disclosure, a consumer may purchase a product and/or service from a merchant/vendor via either an in-store or an on-line sales channel, and may at the time of their purchase be offered the option of having the delivery of the purchased items, or the performance of the service, without their physical presence at their residence (e.g., residence 140). In accordance with various aspects of the present disclosure, unattended delivery of their product or service may be handled in two different ways.

In a first approach, a consumer making a purchase at an in-store point of sale may be offered the option to use a lock-box to be attached to their residence. Information identifying the lock-box provided to the consumer is associated with the consumer's scheduled delivery or service in a computer system such as the computer system 110 of FIG. 1. On the date of the scheduled delivery or service, the consumer places a key to their residence in the lock-box, attaches the lock-box to the entry door, and goes about their schedule for the day. Upon arrival at the residence of the consumer, the assigned service provider uses a software application resident on a handheld device of the service provider such as, for example, the App 2 135 of the service provider device 130 of FIG. 1 described above, to access a code assigned to the lock-box associate with the order of the consumer. The service provider then uses the code to unlock the lock-box and retrieve the key for the consumer entry door, and uses the key to enter the residence of the consumer, and complete the delivery or performance of the service. In accordance with aspects of the present disclosure, arrival at the residence of the consumer (i.e., arrival within the virtual boundary 170) causes the handheld device of the service provider (e.g., the service provider device 130) to activate a camera carried on their person (e.g., camera 137), which records the whereabouts of the service provider for the duration of their visit to the residence of the consumer (i.e., the time during which the service provider is within the virtual boundary 170). Arrival of the service provider at the residence and their departure (e.g., the period during which the service provider is within the virtual boundary 170) is reported by the handheld device of the service provider to a computer system of the merchant/vendor (e.g., the computer system 110 of FIG. 1), which records these events in the records associated with the purchase and the consumer. Note that the handheld device of the service provider requires verification by the camera that the camera is functioning properly before the access code is provided to the service provider. Also note that the access code will not be provided to the service provider if the service provider is not at the residence of the correct consumer corresponding to the scheduled delivery or service (i.e., not within the virtual boundary 170).

In a second approach, a consumer making a purchase at an in-store point of sale of a merchant or vendor may be offered the option to purchase a "wireless smart lock" (e.g., door lock 146 of FIG. 1). This may occur, for example, when the consumer is scheduling delivery of their purchased item(s) or performance of the purchased service(s). The "wireless smart lock" may replace an existing portion of the lock used at the entry of the residence of the consumer. Information identifying the "wireless smart lock" provided to the consumer (e.g., serial number, media access control (MAC) address, model, or similar information) may then be associated with the consumer in storage of a computer system that may remotely enable access to the residence (e.g., the storage 114 of computer system 110 of FIG. 1). In addition, instructions may be provided to the consumer on how to enable the "wireless smart lock" to communicate through the wireless router (e.g., use of Wireless Protect Setup (WPS), association (for Bluetooth), or other similar known methods of enable wireless devices to securely communicate) in their residence. Once installed at the entry door of the consumer residence, the "wireless smart lock" may communicate via a wireless router in the consumer residence (e.g., wireless router 144 of residence 140 of FIG. 1) to a computer system that enable and tracks access to the residence (e.g., computer system 110 of FIG. 1). Following the consumer purchase, a service provider of the merchant/vendor may be assigned to the scheduled delivery of the purchased item(s) or service(s). On the date of the scheduled delivery or service, the consumer simply goes about their schedule for the day. Upon arrival at the residence of the consumer, the assigned service provider uses a software application resident on a handheld device of the service provider such as, for example, the App 2 135 of the service provider device 130 of FIG. 1 described above, to indicate her/his presence at the residence of the consumer having the scheduled delivery or service. The software application then notifies the computer system of the action of the service provider. Note that the arrival of the service provider at the residence (e.g., within the virtual boundary 170 of FIG. 1) automatically notifies the computer system of the presence of the service provider at the consumer residence. The computer system then enables the wireless smart lock (e.g., via the network 105 and wireless router 144 of FIG. 1) to unlock the consumer entry door, and the service provider then enters the residence of the consumer, and complete the delivery or performance of the service. In accordance with aspects of the present disclosure, arrival at the residence of the consumer (i.e., arrival within the virtual boundary 170) causes the handheld device of the service provider (e.g., the service provider device 130) to activate a camera carried on their person (e.g., camera 137), which records the whereabouts of the service provider for the duration of their visit to the residence of the consumer (i.e., the time during which the service provider is within the virtual boundary 170). As noted above, arrival of the service provider at the consumer residence and their departure (e.g., the period during which the service provider is within the virtual boundary 170) is reported by the handheld device of the service provider to a computer system of the merchant/vendor (e.g., the computer system 110 of FIG. 1), which records these events in the records associated with the purchase and the consumer. Note once again that the handheld device of the service provider requires verification by the camera that the camera is functioning properly before the access code is provided to the service provider. Also note that the access code will not be provided to the service provider if the service provider is not at the residence of the correct consumer corresponding to the scheduled delivery or service (i.e., not within the virtual boundary 170).

In accordance with various aspects of the present disclosure, the computer system (e.g., the computer system 110 of FIG. 1) may provide information to the consumer identifying by name, picture, merchant/vendor ID image or number, etc., the service provider that will be visiting the residence of the consumer at the scheduled date and time. Such information may be added with other details of the visit by the service provider in the records for the consumer maintained by the computer system (e.g., computer system 110).

Also in accordance with aspects of the present disclosure, the computer system may provide to the consumer, via a user interface (e.g., via a web page served to a browser on the consumer device 120 or information sent to the App 1 125 of consumer device 120, or any other suitable communication device, personal computer, etc.), suitable controls and displayed information to enable the consumer to schedule access to their residence by individuals other than the service provider(s) of the merchant/vendor. In such an arrangement, use of a camera (e.g., camera 137) and detection of proximity to the residence of the consumer (e.g., using virtual boundary 170) may not be involved. Reporting of the entry to the residence of the consumer by those scheduled by the consumer may occur, depending on options selected by the consumer for the scheduled visit.

In accordance with additional aspects of the present disclosure, approval of entry by the service provider may be requested of the consumer by the computer system described herein. That is, a computer system such as the computer system 110 of FIG. 1 may communicate with the consumer, providing information about the service provider at the time that the service provider is attempting to gain access to the residence. That information may include, for example, a current image of the service provider as provided by the camera carried by the service provider (i.e., the service provider may be required to point the camera at their own face), and a copy of an image of the assigned service provider that is on record on the computer system (e.g., stored on the storage 114 or computer system 110) may also be provided to the consumer, to enable them to determine whether the individual attempting access is the one authorized to visit the residence of the consumer. In accordance with some aspects of the present disclosure, automated face recognition/verification may be used, and images of the service provider during access attempts may be stored on the disclosed computer system for later use. This storage of image information is in addition to the storage of live camera video that may be used during the duration of the visit to the residence of the consumer, described above.

In accordance with aspects of the present disclosure, email or other forms of notification may be sent by the computer system to designated email addresses or other destinations (e.g., text messaging, multimedia service messaging, social media web sites or accounts, etc.) when the events of accessing and leaving the residence of the consumer occurs. Such notifications may include still images or links to video captured at certain times during the visit of the service provider(s).

In accordance with various aspects of the present disclosure, a wireless smart lock as described herein may transmit and receive wireless signals from the service provider device (e.g., service provider device 135), and may also transmit and receive wireless signals to and from a wireless router such as, for example, the wireless router 144 of FIG. 1.

In accordance with additional aspects of the present disclosure, the computer system described herein, or any other suitable element of FIG. 1, may communicate with a commercial security agency or firm to notify the agency when entry by a service provider or other authorized individual to the residence of the consumer will occur, to enable the security agency to be aware of the authorized entrance. Similarly, the computer system may communicate with the security agency when the service provider or other authorized individual has left the residence of the consumer, to enable the security agency to once again fully monitor the residence for any problems.

Aspects of the present disclosure may be found in a method of operating a system enabling remote authorization and monitoring of physical access to a building. Such a method may comprise receiving, by a computer system in response to a consumer retail transaction, a request to schedule physical access by a designated individual to a building of the consumer; and notifying the designated individual of details of the scheduled physical access. The method may also comprise determining whether the designated individual is detected within a defined boundary of the building; and if the designated individual is determined to be within the defined boundary: enabling storage of video images wirelessly received from a camera on the designated individual, and transmitting notification of arrival by the designated individual at the building, to an electronic device of the consumer. The method may also comprise enabling entry of the designated individual into the building of the consumer; and if the designated individual is determined to not be within the defined boundary: disabling storage of video images wirelessly received from the camera on the designated individual, and transmitting notification of departure by the designated individual from the building, to the electronic device of the consumer.

In accordance with the present disclosure, the consumer retail transaction may be received from a retail point of sale terminal, and the computer system may receive the consumer retail transaction from a retail transaction processing system. The camera may be wirelessly coupled to a handheld device of the designated individual that sends the video images to the computer system via a wireless receiver located the building, and enabling entry of the designated individual into the building may comprise verifying that the camera is functioning properly. Enabling entry of the designated individual into the building may comprise assigning the designated individual to the scheduled physical access in the computer system, and the notification of arrival transmitted to the consumer may comprise an image of the designated individual.

Further aspects in accordance with the present disclosure may be seen in a non-transitory computer readable medium having a plurality of code sections, where each code section comprises a plurality of instructions executable by one or more processors, to cause the one or more processors to perform steps of a method such as the method described above.

Additional aspects of the present disclosure may be found in a system enabling remote authorization and monitoring of physical access to a building. Such a system may comprise a computer system comprising one or more processors for communicatively coupling to a handheld electronic device, where the one or more processors may be operable to, at least, perform the actions of the method described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of this disclosure and appended diagrams.

Accordingly, various aspects of the present disclosure may be realized in hardware, software, or a combination of hardware and software. Aspects of the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Various aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While various aspects of the present disclosure have been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method of operating a system enabling remote authorization and monitoring of physical access to a building, the method comprising:
   receiving, via a wireless handheld device of a designated individual from a computer system in response to a consumer retail transaction, information regarding a request for scheduled physical access by the designated individual to a building of the consumer;
   notifying, via the handheld device, the designated individual of details of the scheduled physical access;
   determining, via the handheld device, whether the designated individual is detected within a defined boundary of the building; and
   when the designated individual is determined to be within the defined boundary:
      enabling storage of images received via the handheld device from a camera on the designated individual,
      transmitting, via the handheld device, notification of arrival by the designated individual at the building, to cause a notification at a device of the consumer, and
      enabling entry of the designated individual into the building of the consumer after verification, via the handheld device, that the camera is functioning properly to record the whereabouts of the designated individual while moving about the building of the consumer.

2. The method according to claim 1, wherein the consumer retail transaction is received from a retail point of sale terminal.

3. The method according to claim 1, wherein the computer system receives the consumer retail transaction from a retail transaction processing system.

4. The method according to claim 1, wherein the camera is coupled to the handheld device of the designated individual that sends the images to the computer system via a wireless receiver located in the building.

5. The method according to claim 1, wherein enabling entry of the designated individual into the building comprises assigning the designated individual to the scheduled physical access in the computer system.

6. The method according to claim 1, wherein the notification of arrival transmitted to the consumer comprises an image of the designated individual.

7. A non-transitory computer readable medium having a plurality of code sections, each code section comprising a plurality of instructions executable by one or more processors to cause the one or more processors to perform steps of a method of operating a system enabling remote authorization and monitoring of physical access to a building, the steps comprising:
   receiving, via a wireless handheld device of a designated individual from a computer system in response to a consumer retail transaction, information regarding a request for scheduled physical access by the designated individual to a building of the consumer;
   notifying, via the handheld device, the designated individual of details of the scheduled physical access;
   determining, via the handheld device, whether the designated individual is detected within a defined boundary of the building; and
   when the designated individual is determined to be within the defined boundary:
      enabling storage of images received via the handheld device from a camera on the designated individual,
      transmitting, via the handheld device, notification of arrival by the designated individual at the building, to cause notification at a device of the consumer, and
      enabling entry of the designated individual into the building of the consumer after verification, via the handheld device, that the camera is functioning properly to record the whereabouts of the designated individual while moving about the building of the consumer.

8. The non-transitory computer readable medium according to claim 7, wherein the consumer retail transaction is received from a retail point of sale terminal.

9. The non-transitory computer readable medium according to claim 7, wherein the computer system receives the consumer retail transaction from a retail transaction processing system.

10. The non-transitory computer readable medium according to claim 7, wherein the camera is coupled to the handheld device of the designated individual that sends the images to the computer system via a receiver located in the building.

11. The non-transitory computer readable medium according to claim 7, wherein enabling entry of the designated individual into the building comprises assigning the designated individual to the scheduled physical access in the computer system.

12. The non-transitory computer readable medium according to claim 7, wherein the notification of arrival transmitted to the consumer comprises an image of the designated individual.

13. A system enabling remote authorization and monitoring of physical access to a building, the system comprising:
   one or more processors for communicatively coupling a wireless handheld device to a remote computer system, the one or more processors operable to, at least:
      receive, via the handheld device of a designated individual from the computer system in response to a consumer retail transaction, information regarding a request for scheduled physical access by the designated individual to a building of the consumer;

notify, via the handheld device, the designated individual of details of the scheduled physical access;

determine, via the handheld device, whether the designated individual is detected within a defined boundary of the building; and when the designated individual is determined to be within the defined boundary:

enable storage of images received via the handheld device from a camera on the designated individual, transmit, via the handheld device, notification of arrival by the designated individual at the building, to cause notification at a device of the consumer, and enable entry of the designated individual into the building of the consumer after verification, via the handheld device, that the camera is functioning properly to record the whereabouts of the designated individual while moving about the building of the consumer.

14. The system according to claim 13, wherein the consumer retail transaction is received from a retail point of sale terminal.

15. The system according to claim 13, wherein the computer system receives the consumer retail transaction from a retail transaction processing system.

16. The system according to claim 13, wherein the camera is coupled to the handheld device of the designated individual that sends the images to the computer system via a wireless receiver located in the building.

17. The system according to claim 13, wherein enabling entry of the designated individual into the building comprises assigning the designated individual to the scheduled physical access in the computer system.

18. The system according to claim 13, wherein the notification of arrival transmitted to the consumer comprises an image of the designated individual.

19. The system according to claim 13, wherein the notification of arrival transmitted to the consumer comprises an image of the designated individual taken by the camera when within the defined boundary of the building.

* * * * *